(12) United States Patent
Woywod et al.

(10) Patent No.: US 8,170,765 B2
(45) Date of Patent: May 1, 2012

(54) METHOD FOR REGULATING THE PRESSURE IN AN ELECTRONICALLY CONTROLLED BRAKE SYSTEM, AND ELECTRONIC BRAKE SYSTEM

(75) Inventors: Jürgen Woywod, Mörfelden (DE); Torsten Cress, Schlüchtern (DE); Michael Kremer, Groβ-Zimmern (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 518 days.

(21) Appl. No.: 12/304,621

(22) PCT Filed: Jun. 12, 2007

(86) PCT No.: PCT/EP2007/055748
§ 371 (c)(1),
(2), (4) Date: Sep. 24, 2009

(87) PCT Pub. No.: WO2007/144338
PCT Pub. Date: Dec. 21, 2007

(65) Prior Publication Data
US 2010/0017085 A1    Jan. 21, 2010

(30) Foreign Application Priority Data

Jun. 14, 2006  (DE) .......................... 10 2006 027 999
May 30, 2007  (DE) .......................... 10 2007 025 273

(51) Int. Cl.
*G06F 19/00*    (2006.01)

(52) U.S. Cl. ......................................... 701/70; 303/9.64

(58) Field of Classification Search .................... 701/70, 701/83; 303/9.64, 9.6, 137; 188/354, 359, 188/345
See application file for complete search history.

(56) References Cited

U.S. PATENT DOCUMENTS

| 5,244,259 | A | 9/1993 | Pickenhahn et al. |
| 5,417,482 | A | 5/1995 | Kashima et al. |
| 5,984,429 | A | 11/1999 | Nell et al. |
| 6,733,089 | B1 * | 5/2004 | Wakabayashi et al. ...... 303/9.64 |
| 7,347,508 | B2 * | 3/2008 | Nakayama et al. .......... 303/9.64 |
| 2005/0168059 | A1 | 8/2005 | Nishikawa et al. |
| 2006/0082216 | A1 | 4/2006 | Hamm et al. |
| 2006/0138858 | A1 * | 6/2006 | Nakayama et al. .......... 303/9.64 |
| 2006/0224277 | A1 | 10/2006 | Braeuer et al. |

FOREIGN PATENT DOCUMENTS

| DE | 38 03 563 A1 | 8/1989 |
| DE | 38 41 978 A1 | 6/1990 |
| DE | 40 00 212 A1 | 7/1991 |
| DE | 196 11 360 A1 | 9/1997 |
| DE | 19912878 A1 | 4/2000 |
| DE | 103 16 351 A1 | 10/2004 |
| DE | 1022004025637 A1 | 1/2005 |

(Continued)

*Primary Examiner* — Thomas Black
*Assistant Examiner* — Marthe Marc-Coleman
(74) *Attorney, Agent, or Firm* — RatnerPrestia (57) ABSTRACT

An electronic brake system and a method for regulating the brake pressure in an electronically-controlled brake system of a motorcycle are provided. The method includes the step of actively building a brake pressure in a wheel brake circuit to prevent a motorcycle from moving. The method further includes the step of maintaining the brake pressure in the wheel brake circuit once (i) the motorcycle comes to a standstill or is at a standstill or is approximately at a standstill, and (ii) an activation condition is fulfilled.

18 Claims, 4 Drawing Sheets

FOREIGN PATENT DOCUMENTS

| | | |
|---|---|---|
| DE | 10 2005 003 255 A1 | 8/2005 |
| DE | 102004051119 A1 | 4/2006 |
| EP | 05 48 985 B1 | 6/1993 |
| EP | 0812747 B1 | 8/2002 |
| EP | 14 42 951 A1 | 8/2004 |
| WO | WO 2004071833 A | 8/2004 |

* cited by examiner

METHOD FOR REGULATING THE PRESSURE IN AN ELECTRONICALLY CONTROLLED BRAKE SYSTEM, AND ELECTRONIC BRAKE SYSTEM

CROSS REFERENCE TO RELATED APPLICATIONS

This application is the U.S. national phase application of PCT International Application No. PCT/EP2007/055748, filed Jun. 12, 2007, which claims priority to German Patent Application No. DE102006027999.9, filed Jun. 14, 2006 and German Patent Application No. DE102007025273.2, filed May 30, 2007, the contents of such applications being incorporated by reference herein.

BACKGROUND OF THE INVENTION

1. Field of the Invention

The invention relates to a method for regulating the pressure in an electronically controlled brake system, and an electronic brake system.

2. Description of the Related Art

In the course of the last decades, the motorcycle has developed from a low-cost means of transport to a leisure vehicle in which both safety and rider comfort have moved into the foreground.

Similarly to cars a few years ago, motorcycles are increasingly being equipped with antilock brake systems (ABS). For example, an antilock device for motorcycles is known from EP 0 548 985 61. Furthermore, a method for antilock braking of a motorcycle and for determining the coefficient of adhesion is known from DE 40 00 212 A1.

Traditionally, motorcycles have had an actuating element for each of the two brake circuits. Usually, the front wheel brake is actuated by a "hand brake lever" and the rear wheel brake by a "foot brake lever".

In relation to motorcycles, an "integral brake system" is understood to mean a brake system in which, upon actuation of the hand brake lever or the foot brake lever, the brake of the second brake circuit is additionally braked by an active pressure increase. Both brakes can therefore be operated by actuation of a single actuating element. If both brakes are operated by actuation of both the hand brake lever and the foot brake lever, this is referred to as a fully integral brake. However, combinations in which one brake lever acts on one wheel and the other brake lever on both wheels (partially integral brake) are also possible. Integral brake systems for motorcycles are known, for example, from DE 38 03 563 A1 and DE 103 16 351 A1.

In motorcycles with integral function, as a result of actuation of a single actuating element (e.g. hand brake lever and/or foot brake lever), automatic brake force distribution or brake pressure distribution between front wheel and rear wheel takes place either through fixed hydraulic circuitry, by means of which the brake force distribution is predefined invariably at a given ratio, or through an electronic system by means of which the predetermined brake force distribution is controlled. With electronic systems with integral brake function and antilock function, the brake force distribution between front and rear wheel with ABS braking can be adapted to the actual load (Bremsenhandbuch, $2^{nd}$ edition July 2004, Vieweg Verlag, ISBN 3-528-13952-8, pages 184-192).

A brake system for motorcycles which ensures the functionality of ABS and integral braking in combination with a constructionally simple structure is known from DE 10 2005 003 255 A1.

Because of the increased safety and/or enhanced comfort, It can be expected that partially or fully integral brake systems on motorcycles, which assist the rider by active pressure increase at the front and/or rear wheel during the braking process and therefore ensure an optimized braking distance, will be increasingly used in future.

In order to hold a motorcycle on an uphill gradient, it has been necessary up to now for the rider to prevent the vehicle from rolling back by operating the front wheel and/or rear wheel brake. In the case of motorcycles without an integral brake system, actuation of the hand brake lever (front wheel brake) alone can in some cases be insufficient to hold the vehicle securely on steep uphill gradients. The rider must then also operate the foot brake lever in order to hold the vehicle.

On motorcycles with an integral brake system and on motorcycles without an integral brake system, holding the vehicle by operating the hand brake lever and then starting becomes a relatively complex sequence of movements requiring fine motor control, since both the hand brake lever and the throttle control must be operated with the right hand. This represents a challenge even for an experienced rider.

Operation of the foot brake lever for holding the motorcycle poses major challenges especially for shorter riders, since only one leg is now available for stabilizing the motorcycle.

It is therefore an object of the invention to make available a method for regulating the brake pressure in an electronically controlled brake system of a motorcycle, in particular an integral brake system for a motorcycle, and an electronic brake system for a motorcycle, in particular an integral brake system for a motorcycle, which simplifies holding the motorcycle and/or starting.

SUMMARY OF THE INVENTION

The invention relates to the concept of actively building up and then maintaining a brake pressure in a wheel brake circuit when the motorcycle is stationary or approximately stationary and an activation condition is fulfilled. The motorcycle is thereby prevented from rolling away, and holding and/or stabilizing of the motorcycle is achieved.

The method is preferably carried out in order to hold and/or stabilize the motorcycle, and/or to prevent the motorcycle from rolling away, after the ending of a brake actuation, for example an actuation of the hand brake lever, by the rider.

According to a preferred embodiment, the activation condition is detection that the motorcycle is stationary on an inclined roadway. Assistance of the motorcycle rider by the brake system is especially advantageous when holding the motorcycle on a rising or descending gradient. In this case, detection of an inclined roadway is carried out especially preferably by means of a longitudinal acceleration sensor. The acceleration sensor is very especially preferably fixed to the frame of the motorcycle, because it is exposed to a few shocks at that location. In this case, mounting of the acceleration sensor in the region of the center of gravity of the motorcycle is very especially advantageous.

Alternatively or additionally, it is preferred that the activation condition is a characteristic actuation of a brake actuating element by the rider. The rider is thereby given the possibility of himself controlling the start of the increase in brake pressure. He can therefore activate the hold function according to his wishes and/or the given situation. Especially preferably, a characteristic actuation of the hand brake lever is performed as the activation condition.

The characteristic actuation of the brake actuating element is preferably an actuation of the brake actuating element which is stronger than the actuation of the brake actuating element which was necessary for stopping the motorcycle. By a stronger pulling of the hand brake lever or a stronger pressing of the foot brake lever at the end of braking for stopping the motorcycle, the rider can therefore activate the hold function in a simple manner. Especially preferably, actuation of the brake actuating element is detected as the activation condition if the master cylinder pressure produced by the actuation is greater by a predefined amount than the master cylinder pressure which occurred during stopping of the motorcycle.

A standstill or approximate standstill of the motorcycle is preferably detected by means of a wheel rotational speed sensor. Especially preferably, the standstill or approximate standstill is detected by the fact that the rotational speed(s) of one wheel or both wheels is/are lower than a predefined threshold value. Using modern wheel rotational speed sensors, very accurate determination of the desired limit speed is thereby possible. It is also especially preferred, in detecting standstill, to consider a different wheel rotational speed value which corresponds to the wheel rotational speed, instead of a wheel rotational speed.

The amount of brake pressure which is built up in relation to the hold function, or the amount of brake pressure increase which is implemented in relation to the hold function, is preferably permanently predefined. For this purpose, corresponding specifications are especially preferably stored in the brake control unit.

However, It is also preferred to select the amount of brake pressure which is built up in relation to the hold function, or the amount of brake pressure increase which is implemented in relation to the hold function, as a function of an environmental parameter and/or a state value of the motorcycle. A situation-appropriate selection of the amount of brake pressure, or of the amount of brake pressure increase, which securely ensures holding of the motorcycle but also does not result in any unnecessary over-dimensioning of the brake pressure, is thereby provided. Especially preferably, the amount of brake pressure which is induced by the control system in relation to the hold function Is selected as a function of the brake pressure required for holding. Very especially preferably, the holding brake pressure is selected as the brake pressure present at the moment of stopping the motorcycle, increased by a predefined value.

According to a preferred embodiment, the amount of brake pressure which is built up in relation to the hold function, or the amount of brake pressure increase which is implemented in relation to the hold function, is calculated as a function of the amount of inclination of the roadway. In this case, the amount of roadway inclination Is determined especially preferably by means of a longitudinal acceleration sensor. The dimensioning of the holding brake pressure as a function of roadway inclination Is advantageous in order to ensure secure holding even on very steep slopes.

Alternatively or additionally, the amount of brake pressure, or the amount of brake pressure increase, is preferably selected as a function of the load state of the motorcycle and/or the type of the motorcycle. In this way secure holding of the motorcycle is ensured even in the case of heavy motorcycles and/or heavy luggage.

If it is detected that the rider wishes to restart, according to a preferred embodiment of the inventive method the brake pressure actively built up and maintained by the hold function is reduced again. The reduction is effected especially preferably by means of a linear function. The rider is thereby given the opportunity to operate the throttle lever appropriately, so that the motorcycle starts without rolling back. Alternatively, it Is especially preferred first to reduce the brake pressure discontinuously by a predefined value and then to reduce it according to a linear function. Very especially preferably, the gradient of the linear function is predefined. It is also very especially preferred that the value of the discontinuous brake pressure reduction is predefined. The amount of the discontinuous brake pressure reduction advantageously corresponds to the predefined value which is added to the brake pressure present at the moment of stopping the motorcycle in order to obtain the holding brake pressure.

According to another preferred embodiment, the reduction in brake pressure is implemented as a function of an environmental parameter and/or a state value of the motorcycle. Especially preferably, the brake pressure is reduced by means of a linear function, the gradient of which is selected as a function of the amount of inclination of the roadway and/or of the engine torque and/or of the brake pressure necessary for holding and/or of the throttle angle.

A starting of the motorcycle is preferably detected by consideration of state values of the motorcycle. For this purpose, the throttle angle and/or the engine speed and/or the engine torque are especially preferably evaluated.

In the event that the activation condition is actuation of a brake actuating element, the brake pressure maintained in the wheel brake circuit by the hold function is preferably reduced again when the activation condition recurs. In this way, the rider can advantageously switch the hold function on and off in a simple manner according to his wishes by repeated actuation of the brake actuating element. Especially preferably, the brake pressure is reduced to zero upon deactivation of the hold function. This is effected very especially preferably discontinuously or by means of a linear function.

An advantage of the invention lies in the improved security when holding and starting on an incline. Through the invention, the motorcycle rider is relieved of tasks and can therefore better concentrate on the traffic. The probability of the motorcycle falling over when stationary on an incline, for example at a traffic light, is also reduced by the invention, as the rider can use both legs to stabilize the motorcycle, since he does not have to operate the brake lever to hold the motorcycle.

These and other aspects of the invention are illustrated in detail by way of the embodiments and are described, with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

The method according to aspects of the invention is described below with reference to a motorcycle brake system with partially integral brake function (see FIG. 1); however, it can be carried out in any other brake system in which an active increase of brake pressure is implemented. For example, the method can be carried out in a fully integral motorcycle brake system.

Figure 1:
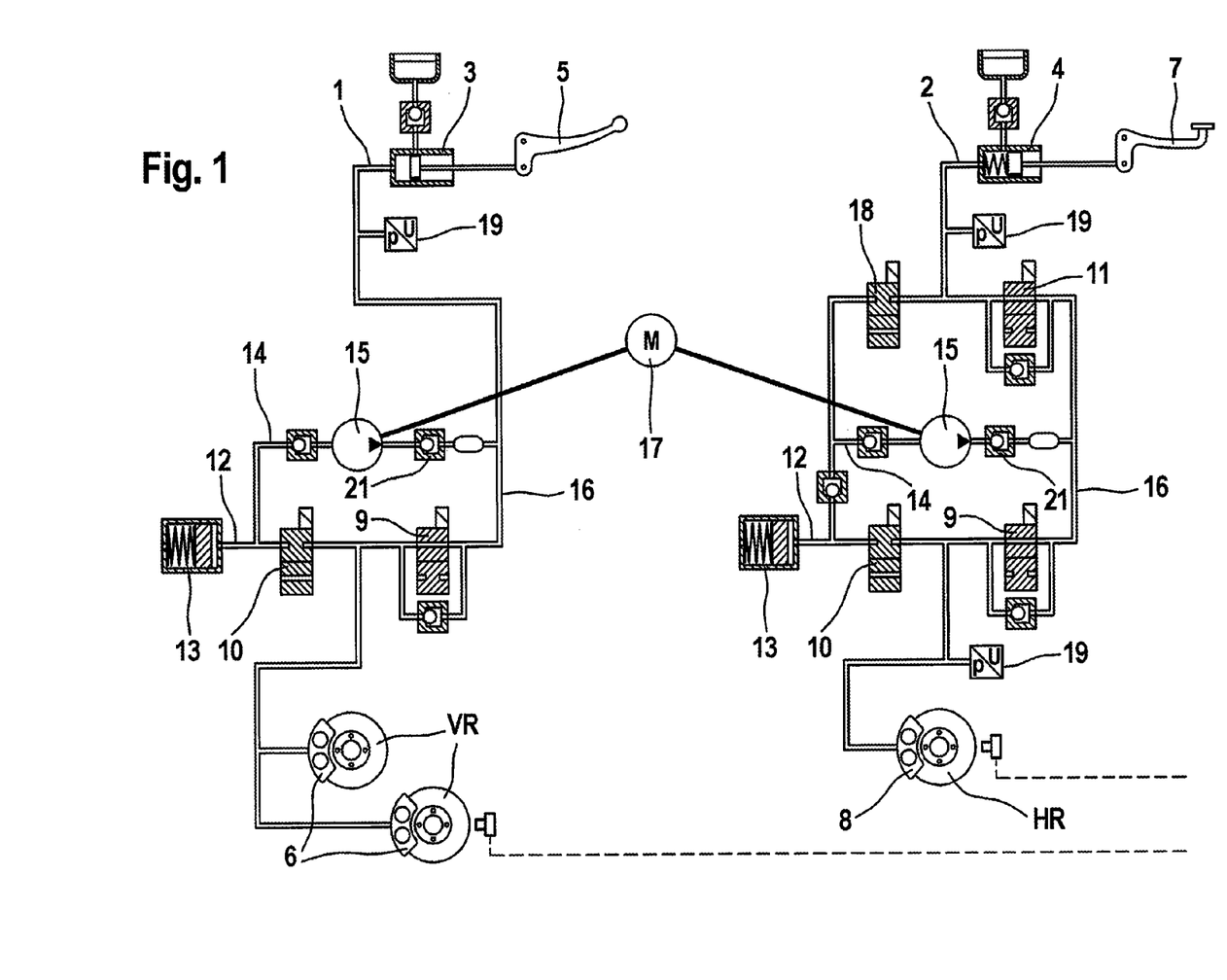
FIG. 1 shows an exemplary partially integral brake system of a motorcycle for carrying out a method according to aspects of the invention, FIG. 2 Is a representation of a motorcycle on an incline.

FIG. 1 shows schematically an exemplary partially integral brake system for a motorcycle. This system consists of two brake circuits 1, 2, one for the front wheel VR and one for the rear wheel HR, each having a brake master cylinder 3, 4. The rider operates the front wheel brake 6 directly with a hand brake lever 5, and the rear wheel brake 8 is operated with a foot pedal 7.

For anti-slip brake control, electromagnetically actuatable inlet and outlet valves 9, 10 are arranged in both the front and rear wheel brake circuits 1, 2, an inlet valve 9, which is open in the normal position, being inserted in the brake lines of each of the front and rear wheel brake circuits 1, 2, which inlet valve 9 connects the respective associated brake master cylinder 3, 4 to the front or rear wheel brake 6, 8. In addition, a block valve 11, which is open in the normal position, is located in the rear wheel brake circuit 2. The outlet valve 10, which is closed in the normal position, is inserted in a return line 12 of each brake circuit, which outlet valve 10 connects the front or rear wheel brake 6, 8 to a respective low- pressure accumulator 13 and to the suction path 14 of a dual-circuit split pump 15 working on the recirculation principle. The pump 15 is connected on the pressure side to the brake lines 16 of both brake circuits, so that, in a brake anti-slip control phase, a demand- appropriate recirculation of the brake fluid volume discharged by the respective front or rear wheel brake 6, 8 into the brake lines 16 of both brake circuits is ensured. The pump pistons of both pump circuits are driven jointly by an electric motor 17.

According to their circuit structure, both brake circuits 1, 2 are actuatable jointly and independently of one another, with the special feature that upon manual actuation of the brake master cylinder 3 connected to the front wheel brake circuit 1, not only does a brake pressure increase take place in the front wheel brake 6, but simultaneously an electro- hydraulic brake pressure increase (active pressure increase) also takes place in the rear wheel brake 8, in that the electric motor 17 puts the pump 15 into operation as soon as the pump 15 draws pressure medium from the brake master cylinder 4 and supplies it to the rear wheel brake 8 as a result of the electrically initiated opening of the reversing valve 18 in the rear wheel brake circuit 2, while the block valve 11 in the rear wheel brake circuit 2 separates the pump pressure side from the brake master cylinder 4.

Figure 2:
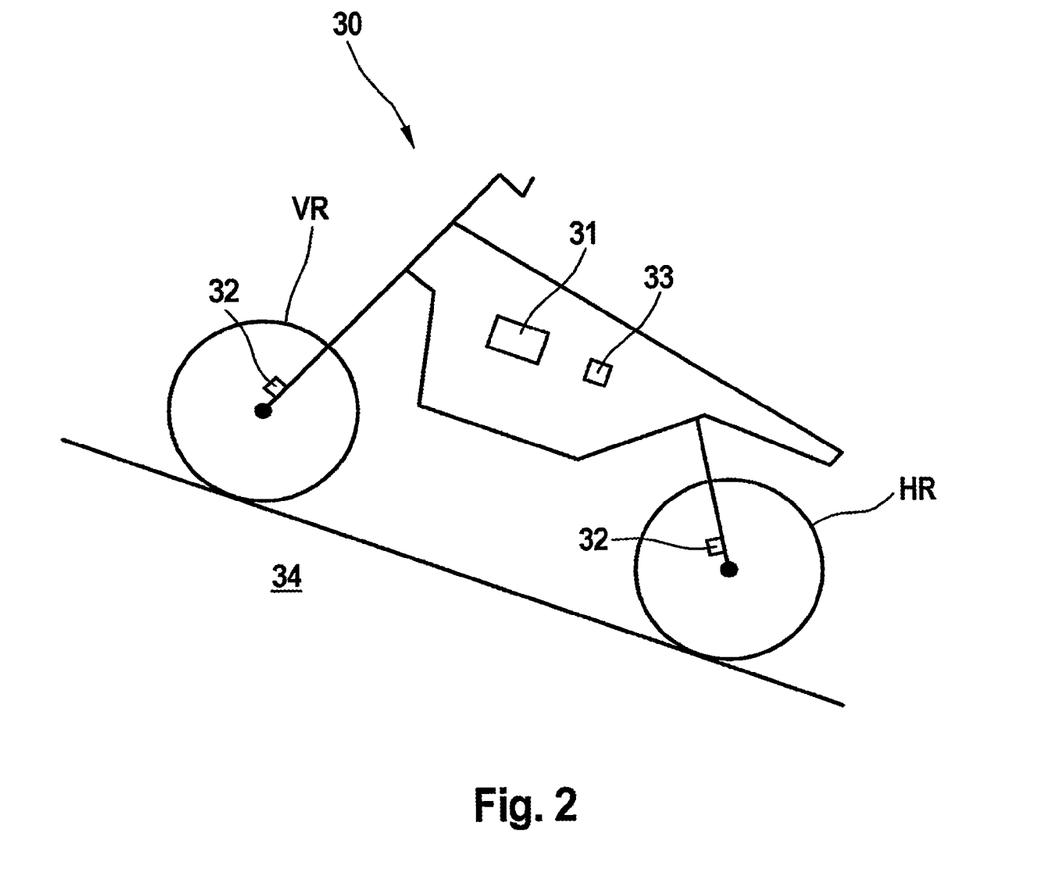

FIG. 2 is a schematic representation of an exemplary motorcycle on an Incline. The motorcycle 30 with control unit 31, a wheel rotational speed sensor 32 on front wheel VR and rear wheel HR, and longitudinal acceleration sensor 33 is located on an incline 34. The motorcycle 30 is equipped in an exemplary manner with the partially integral brake system shown in FIG. 1. The control unit 31 is designed to control the brake system and to control the implementation of an inventive method (hold function or hold and start function). The acceleration sensor 33 is arranged in an exemplary manner on a frame of the motorcycle.

Figure 3:
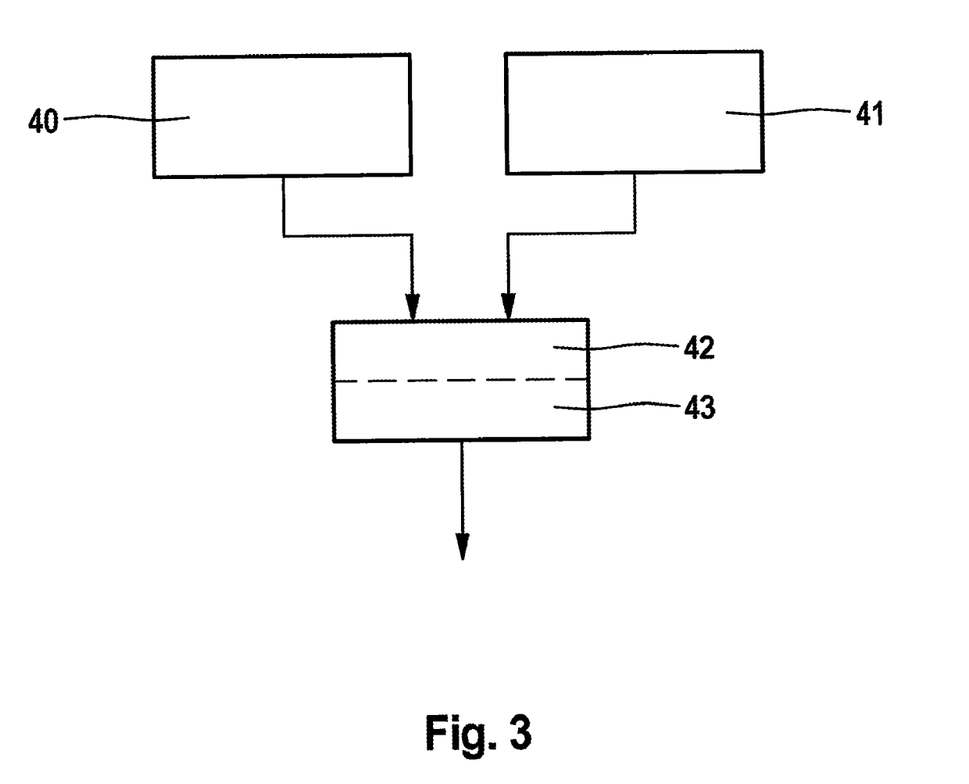
FIG. 3 is a flow diagram of an exemplary embodiment of a method according to aspects of the invention.

An exemplary embodiment of an inventive method is shown in FIG. 3 in the form of a schematic flow diagram. In block 40 it Is checked whether the motorcycle 30 is at standstill or approximate standstill. In block 41 it is checked whether an activation condition is fulfilled. If both conditions are fulfilled simultaneously or in close temporal succession, a brake pressure is first actively increased in a brake circuit 1, 2, for example in the rear wheel brake circuit 2 (block 42), and then this brake pressure is (approximately) maintained (block 43).

According to aspects of the invention, it is possible to hold the vehicle 30 securely on the slope 34 by an active pressure increase, for example in the rear wheel brake circuit 2, without the rider needing to execute a further brake actuation on either of the brake actuating elements 5, 7.

Standstill or approximate standstill of the motorcycle 30 (block 40) is detected in an exemplary manner with reference to the signals of the wheel rotational speed sensors 32. If the wheel rotational speed, for example of the rear wheel HR, is lower than a predefined threshold value, an (approximate) standstill of the motorcycle 30 is detected. Instead of the wheel rotational speed, a different wheel rotational speed value corresponding to the wheel rotational speed may also be used for detecting standstill.

Two exemplary embodiments of an activation condition of the hold function (block 41) are described below.

According to a first exemplary embodiment, the activation condition (block 41) is detection of standstill of the motorcycle 30 on an inclined roadway 34. The detection of an inclined roadway 34 may be effected, for example, by means of a longitudinal acceleration sensor 33. The slope inclination is detected and measured by the sensor 33. Above an adjustable value (e.g. 5% ascending or descending gradient) the system is ready with regard to the hold function.

If the vehicle 30 is now brought to a standstill on a sufficiently steep incline (block 40), a defined pressure is built up by the brake system in the rear wheel brake circuit 2 (block 42). The brake pressure is then "blocked in" by the system via block valve 11, that is, the brake pressure is maintained (approximately) constant (block 43). The pressure remains (approximately) constant even if the rider releases or partially releases the hand brake lever 5 and/or the foot brake lever 7 after the motorcycle 30 has been at standstill.

The amount of the brake pressure (holding brake pressure) built up in the rear wheel brake circuit 2 depends, for example, on the vehicle type and/or on the particular slope inclination measured. However, the amount of the brake pressure may alternatively or additionally depend on the load state of the motorcycle 30. For example, the pressure is calculated such that the motorcycle is just held securely on the Incline 34 even when fully loaded.

According to a second exemplary embodiment, the activation condition (block 41) is an actuation of a brake actuating element, for example the hand brake lever 5. In this exemplary embodiment, therefore, the motorcycle 30 does not need to have a longitudinal acceleration sensor 33. Activation of the active brake pressure increase is therefore now effected by the rider via an actuation of a brake lever 5, 7 upon or after detection of (approximate) standstill (block 40) of the motorcycle 30.

In order to activate the hold function (active pressure increase followed by pressure-hold) in the second exemplary embodiment, the rider actuates the front wheel brake 6 (right-hand hand brake lever 5, Including integral function in the example) with a higher pressure $p'_{HZ}$ than the pressure $p_{HZ}$ which was needed to achieve standstill of the vehicle ($p'_{HZ} > p_{HZ}$). A sufficient pressure to hold the motorcycle on the incline 34 (as in the exposition for the first exemplary embodiment) is then built up by the system in the rear wheel brake circuit 2 (block 42) and then maintained (block 43).

According to the example, in order to activate the hold function, the rider must actuate the brake lever 5 with a pressure $p'_{HZ}$ which is greater by a predefined or adjustable pressure difference $\Delta p$ than the pressure $p_{HZ}$ which was necessary to stop the motorcycle 30 ($p'_{HZ} \geq P_{HZ}+\Delta p$). The pressure difference $\Delta p$ is, for example, a few bar, for example approximately 10 bar ($\Delta p=10$ bar).

In the second exemplary embodiment, the value of the brake pressure built up in the rear wheel brake circuit 2 is not dependent on the slope inclination 34, since no sensor for determining slope inclination is present. The amount of the active pressure increase (or the amount of the brake pressure) after standstill of the vehicle may be equal in all cases (that is, a predetermined, constant value), or may be selected as a function of parameters, for example the load state of the motorcycle 30 and/or the motorcycle type. According to this example, the pressure is also calculated such that the motorcycle 30 is just held securely on the incline 34 even when fully loaded.

Maintenance of the brake pressure by the hold function (block 43) may be without time limit if the rider does not wish to start, or may be implemented up to a predefinable or adjustable maximum time.

Figure 4:
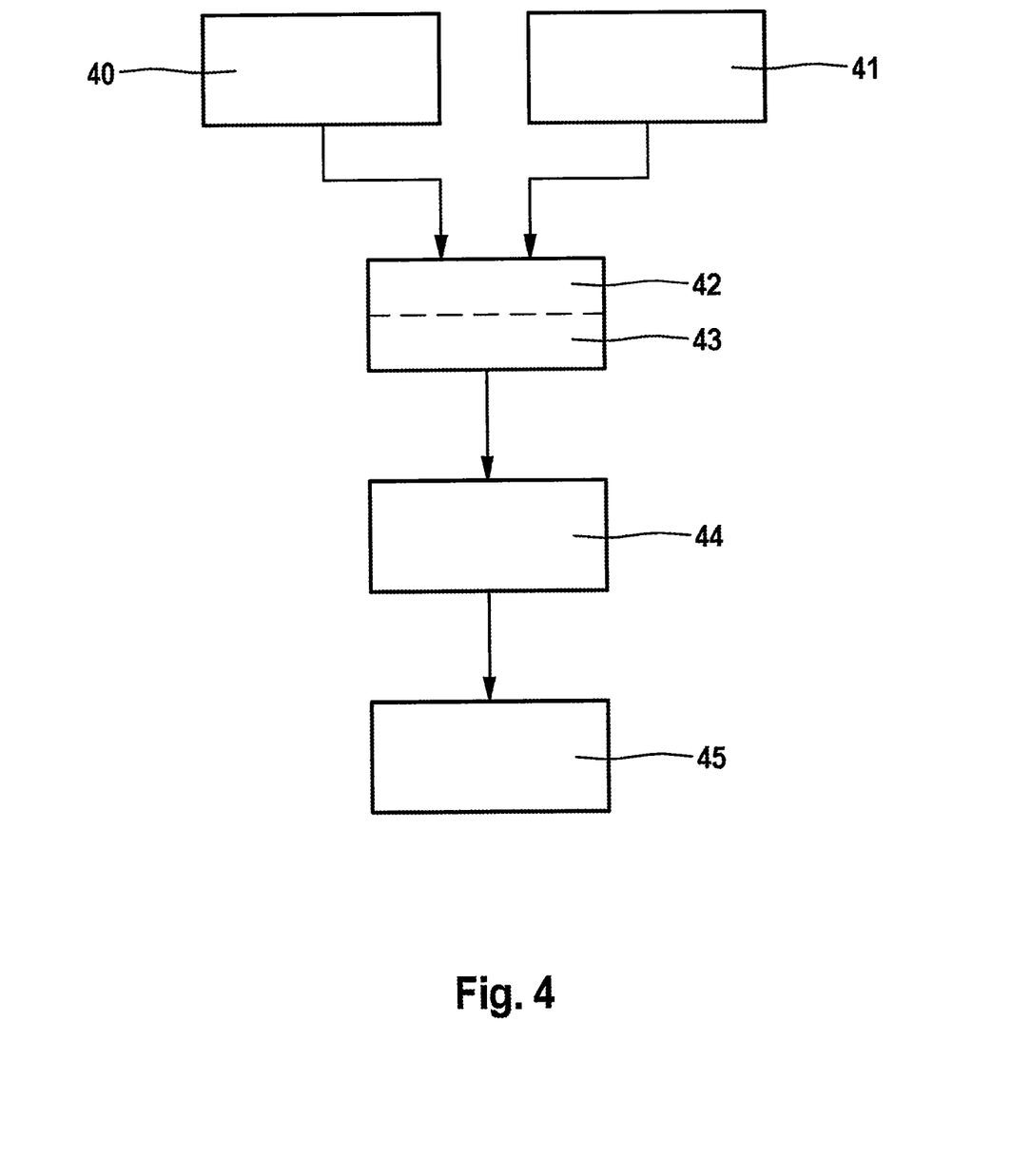
FIG. 4 is a flow diagram of the exemplary embodiment of FIG. 3 supplemented by an exemplary embodiment of a start detection system according to aspects of the invention.

FIG. 4 shows schematically a further exemplary embodiment of an inventive method as a flow diagram, in which the exemplary embodiment (hold function) shown in FIG. 3 is extended by a start function. Blocks 40 to 43 were described in detail above in the description relating to FIG. 3, and that description also applies to the exemplary embodiment shown in FIG. 4. In the exemplary embodiment of FIG. 4 it is additionally checked in block 44 whether the rider is starting or wishes to start (start detection). If this is the case, the brake pressure maintained up to then (block 43) is reduced again (block 45).

Start processes, and therefore ending of the hold function, are detected, for example, by the system. A start detection is effected, for example, by observation of the throttle angle and/or the engine speed and/or the drive torque/engine torque.

Upon detection of a start situation (block 44), the previously "blocked-in" brake pressure (block 43) in the rear wheel brake circuit 2 is reduced in a specified manner by means of a, for example predefined, ramp function, in such a manner that the rider can start without difficulty and without rolling back. For this purpose, the reduction of the brake pressure may be implemented, for example, as a function of the amount of inclination of the roadway 34. The brake pressure reduction may also be implemented as a function of vehicle parameters, for example as a function of engine torque. In a vehicle without an engine torque interface the brake pressure is reduced, for example after starting has been detected, in a time-controlled manner, for example according to a linear function, or initially discontinuously by a predetermined value and then according to a linear function. In a vehicle with an engine torque interface, the brake pressure is reduced in inverse proportion to the engine torque, for example.

According to an exemplary embodiment, the brake pressure reduction is carried out according to a linear function, the gradient of which (brake pressure reduction gradient) is selected as a function of throttle angle and/or holding brake pressure. The brake pressure reduction gradient therefore depends on how far the rider opens the throttle and/or how high the necessary holding pressure was. In the example, the brake pressure reduction gradient DG is calculated from the product of a first polynomial P1 as a function of throttle angle $\alpha$ and a second polynomial P2 as a function of holding pressure $p_{Halt}$:

$$DG=P1(\alpha)*P2(p_{Halt}).$$

The polynomials are selected such that comfortable starting without rolling back is ensured for the vehicle concerned.

If the hold function was activated by actuation of a brake lever, it is additionally or alternatively possible to end the hold function manually by a second brake lever actuation analogous to the activation. For example, if the hand brake lever 5 is actuated by the rider a further time, after activation of the hold function, with a higher pressure $p'_{HZ}$ than the pressure $p_H$ which was needed to achieve standstill of the vehicle, the actively increased and maintained brake pressure is then reduced again. For this purpose, the brake pressure is reduced, for example, to zero bar. The reduction may take place discontinuously or via a ramp.

In general, it is the case that the rider is responsible for (first) achieving standstill (stopping) and the hold function for maintaining standstill.

Combinations of the two exemplary embodiments, that is, incline/gradient detection and brake lever actuation for activating the hold function, are also possible.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for regulating the brake pressure in an electronically-controlled brake system of a motorcycle comprising the steps of:
   actively building a brake pressure in a wheel brake circuit to prevent a motorcycle from moving; and
   maintaining the brake pressure in the wheel brake circuit once (i) the motorcycle comes to a standstill or is at a standstill or is approximately at a standstill, and (ii) an activation condition is fulfilled.

2. The method as claimed in claim 1, wherein the activation condition is a detection that the motorcycle is stationary on an inclined roadway.

3. The method as claimed in claim 1, wherein the activation condition is detected by (i) a longitudinal acceleration sensor, (ii) an actuation of a brake actuating element which fulfills at least one predefined condition, or (iii) a longitudinal acceleration sensor and an actuation of a brake actuating element which fulfills at least one predefined condition.

4. The method as claimed in claim 2, wherein the predefined condition is fulfilled when an actuation ($p'_{HZ}$) of the brake actuating element is greater than an actuation ($p_{HZ}$) of the brake actuating element that is necessary for stopping the motorcycle.

5. The method as claimed in claim 1, wherein the standstill or approximate standstill of the motorcycle is detected by at least one wheel rotational speed sensor.

6. The method as claimed in claim 5, wherein a standstill or approximate standstill is detected when a wheel rotational speed, or a wheel rotational speed value corresponding to the wheel rotational speed, falls below a threshold value.

7. The method as claimed in claim 1, wherein the amount of brake pressure built up or the amount of brake pressure increase is predetermined or is selected as a function of (i) at least one environmental parameter, (ii) a state value of the motorcycle, or (iii) at least one environmental parameter and a state value of the motorcycle.

8. The method as claimed in claim 7, wherein the amount of brake pressure built up or the amount of brake pressure increase is predetermined or is selected as a function of the brake pressure required for holding.

9. The method as claimed in claim 8, wherein the amount of brake pressure built up or the amount of brake pressure increase is selected as a function of an inclination of the roadway, a load state of the motorcycle, a style of the motorcycle, or any combination thereof.

10. The method as claimed in claim 1, further comprising the step of reducing the brake pressure maintained in the wheel brake circuit.

11. The method as claimed in claim 10, wherein the brake pressure maintained in the wheel brake circuit is reduced either discontinuously, by a linear function, or both, upon starting of the motorcycle.

12. The method as claimed in claim 11, wherein starting of the motorcycle is detected with reference to at least one state value of the motorcycle.

13. The method as claimed in claim 12, wherein the at least one state value of the motorcycle is a throttle angle, an engine speed, an engine torque, or any combination thereof.

14. The method as claimed in claim 10, wherein the reduction of the brake pressure is effected as a function of at least one environmental parameter or a state value of the motorcycle.

15. The method as claimed in claim 14, wherein the reduction of the brake pressure is effected as a function of at least one of the following values: amount of inclination of the roadway, engine torque, holding brake pressure, and throttle angle.

16. The method as claimed in claim 1, wherein the activation condition is detected by an actuation of a brake actuating element which fulfills at least one predefined condition, wherein the brake pressure maintained in the wheel brake circuit is reduced if the activation condition recurs.

17. The method as claimed in claim 1, wherein the step of actively building comprises building a brake pressure in the rear wheel brake circuit of the motorcycle.

18. An integral brake system for a motorcycle, wherein a method as claimed in claim 1 is carried out therein.

\* \* \* \* \*